United States Patent [19]

Lew

[11] Patent Number: 4,648,278
[45] Date of Patent: Mar. 10, 1987

[54] SPIRAL COIL TARGET FLOW METER

[76] Inventor: Hyok S. Lew, 7890 Oak St., Arvada, Colo. 80005

[21] Appl. No.: 730,854

[22] Filed: May 6, 1985

[51] Int. Cl.[4] .............................................. G01F 1/28
[52] U.S. Cl. ................................................. 73/861.71
[58] Field of Search ........... 73/861.42, 861.52, 861.53, 73/861.58, 861.61, 861.71, 861.72, 861.74

[56] References Cited

U.S. PATENT DOCUMENTS

| | | | |
|---|---|---|---|
| 2,800,794 | 7/1957 | Meneghelli | 73/861.72 |
| 2,811,855 | 11/1957 | Kotas | 73/861.72 |
| 2,979,947 | 4/1961 | Main et al. | 73/861.53 |
| 3,167,691 | 1/1965 | Halista | 73/861.72 |
| 3,403,556 | 10/1968 | Koester | 73/861.53 |

Primary Examiner—Herbert Goldstein

[57] ABSTRACT

This invention discloses a flowmeter employing a spiral coil target coaxially disposed within a flow passage included in the body of the flowmeter, wherein the drag and/or torque imposed on the spiral coil target by the moving fluid medium is measured and converted to the flow rate of the fluid medium moving through the flow passage. A flat or conical spiral coil made of a wire or strip of a non-lift generating cross section is used as a target to generate the drag thereon, which drag is converted to the flow rate. A conical spiral coil made of a wire or strip of a non-lift generating cross section or a planar or conical spiral coil made of a strip of a lift generating cross section is used as a target to generate the torque thereon, which torque is converted to the flow rate.

14 Claims, 17 Drawing Figures

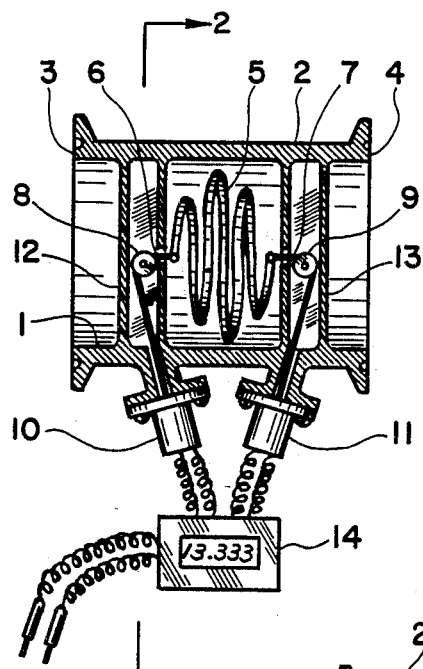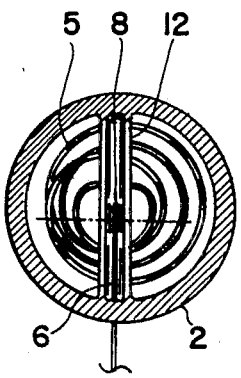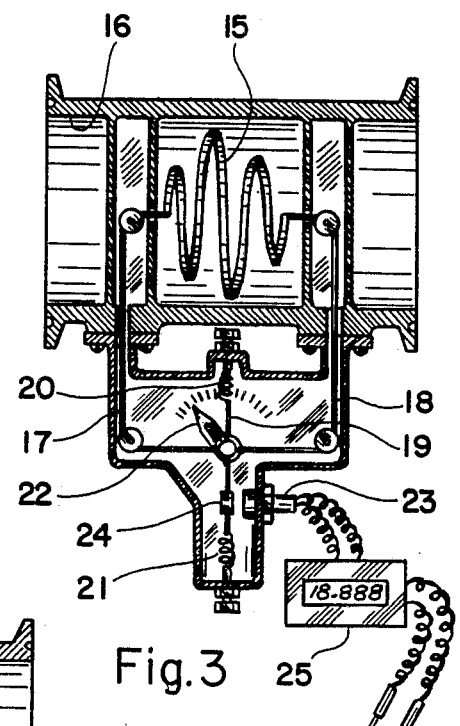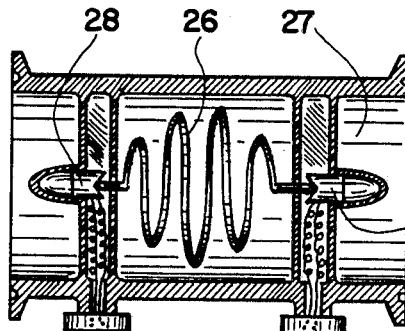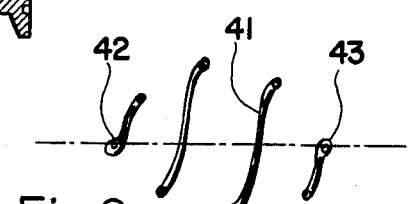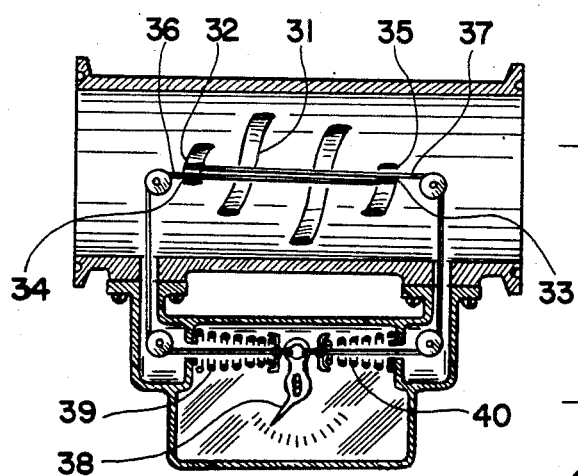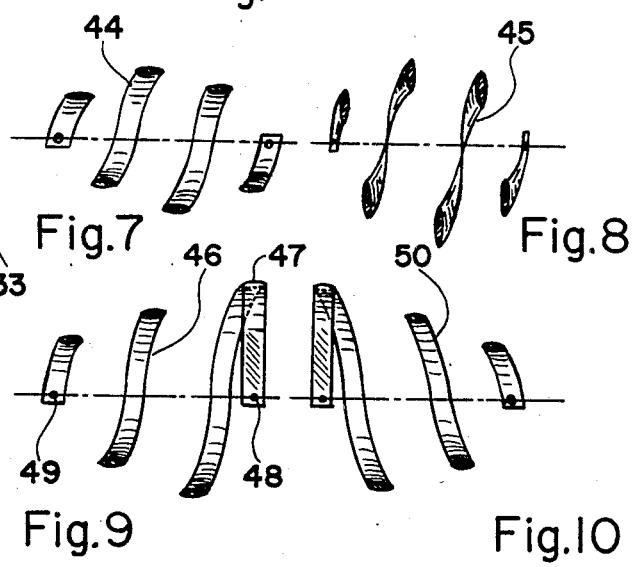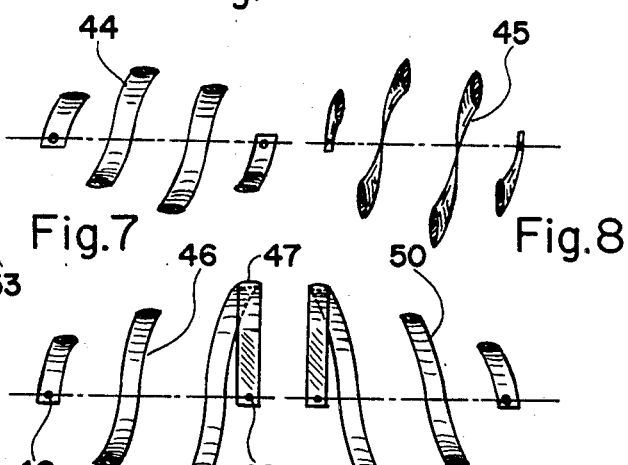

SPIRAL COIL TARGET FLOW METER

BACKGROUND OF THE INVENTION

Today's explosive development of computer technology has helped to automate many process industries in the chemical, mineral, food and pharmaceutical fields. The two most important elements in the process automation is the flow meter and the flow control valve. It is generally true that the development of flow measurement technology lags far behind the state of the art of flow control valves and the computer hardwares employed in the process automation in terms of accuracy, consistency and durability.

The primary object of the present invention is to provide a flow meter that measures the flow rate by sensing the flow distributed over the entire cross section of the flow meter conduit.

Another object is to provide a new flow meter technology suitable for flow meters employing conduits ranging from a small diameters to very large diameters.

A further object is to provide a new flow meter technology that employs no constantly moving parts.

Yet another object is to provide flow meters which are accurate and durable and yet inexpensive and compact.

Yet a further object is to provide flow meters using the spiral coils as the targets for generating fluid dynamic drag that is then converted to flow rate data.

Still another object is to provide flow meters using spiral coils as the targets for generating fluid dynamic torque that is then converted to flow rate data.

Still a further object is to provide flow meters using spiral coils of a non-lift generating cross section as targets to measure fluid dynamic reaction that is then converted to flow rate data.

Another additional object is to provide flow meters using spiral coils of a lift generating cross section as targets to measure fluid dynamic reaction that is then converted to the flow rate data.

These and other objects of the present invention will become clear as the description thereof proceeds.

BRIEF DESCRIPTION OF THE FIGURES

The present invention may be described with a greater clarity and specificity by referring to the following figures:

FIG. 1 illustrates a cross section of an embodiment of the spiral coil target flow meter employing a dual cone spiral coil under tension.

FIG. 2 illustrates another cross section of the spiral coil target flow meter shown in FIG. 1.

FIG. 3 illustrates a cross section of another embodiment of the spiral coil target flow meter employing a dual cone spiral coil under tension..

FIG. 4 illustrates a cross section of a further embodiment of the spiral coil target flow meter employing a dual cone spiral coil under compression.

FIG. 5 illustrates a cross section of yet another embodiment of the spiral coil target flow meter employing a dual cone spiral coil under compression.

FIG. 6 illustrates a cross section of a dual cone spiral coil target usable in conjunction with the construction of a spiral coil target flow meter.

FIG. 7 illustrates a cross section of another dual cone spiral coil target.

FIG. 8 illustrates a cross section of a further dual cone spiral coil target.

FIG. 9 illustrates a cross section of a simple cone spiral coil target usable in conjunction with the construction of a spiral coil target flow meter.

FIG. 10 illustrates a cross section of another simple cone spiral coil target.

DESCRIPTION OF THE ILLUSTRATED EMBODIMENTS

Figure 11:
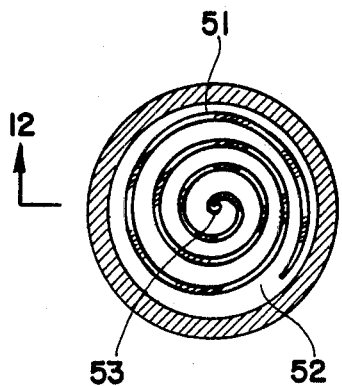
FIG. 11 illustrates a cross section of a spiral coil target flow meter employing a substantially flat spiral coil target.

In FIG. 1 there is illustrated a cross section of an embodiment of the spiral coil target flow meter, which cross section is taken along a plane including the central axis of the flow passage 1 disposed through the flow meter body 2 that includes a pair of adapting means 3 and 4 respectively disposed at two extremities of the flow passage 1 for connection to a pipe line. The dual cone spiral coil target 5 is disposed coaxially within the flow passage 1 having a substantially circular cross section. The dual cone spiral coil target 5 is made of a metalic or rigid plastic member of elongated geometry having a high level of stiffness, which spirals out starting from one extremity located at the central axis of the spiral coil and spirals in to the other extremity located at the central axis of the spiral coil. The dual cone shape of the spiral coil target 5 may be obtained by forming the spiral coil in such a configuration or by stretching a substantially flat spiral coil spring. The dual cone spiral coil target 5 is secured coaxially within the flow passage 2 by a pair of cords 6 and 7 respectively secured to and extending from two extremities of the elongated member constituting the spiral coil target 5, which cords routed in line to one another and coinciding with the central axis of the flow passage 1 respectively engage a pair of sheaves 8 and 9 and extend through the wall of the flow passage 1, wherein they are connected to a pair of load cells 10 and 11. The sheaves 8 and 9 are supported by and hidden inside the thin hollow fairings 12 and 13, respectively, which are secured to the wall of the flow passage 1 after traversing across the flow passage 1. It should be understood that the dual cone spiral coil 5 and the cords 6 and 7 extending therefrom and anchored to the load cells 10 and 11 are under high tension. When there is no flow and, consequently, no drag on the spiral coil target 5, the load cells 10 and 11 register the same tension. When there is flow through the flow passage 1, the difference in the register between two load cells 10 and 11 is equal to the drag force exerted on the spiral coil target 5 by the moving fluid, which is a function of the density and flow velocity of the fluid. The information on the drag force measured by the load cells 10 and 11 is fed to a data processor 14 that converts the data on the drag force to the flow rate, which may be displayed or transmitted to another process control device as an input signal thereto.

In FIG. 2 there is shown a cross section of the spiral coil target flow meter illustrated in FIG. 1 taken along plane 2—2 as shown in FIG. 1. Here, it is clearly shown that the spiral coil target 5 encompasses the entire cross section of the flow passage and, consequently, gathers information on the flow distributed over the entire cross section of the flow passage. This feature of the spiral coil target is particularly advantageous for the construction of a flow meter having a large diameter flow passage.

In FIG. 3 there is illustrated a cross section of another embodiment of the spiral coil target flow meter comprising the same arrangement of the dual cone spiral coil target 15 coaxially included within the flow passage 16 as the arrangement shown in FIG. 1 and 2. The extremities of the tensioning cords 17 and 18 respectively secured to and extending from two extremities of the elongated member constituting the dual cone spiral coil target 15 is secured to the midsection of a balancing tension cord 19 after engaging a plurality of sheaves, wherein the two cords 17 and 18 routed in line to one another and connected to the midsection of the balancing tension cord 19 in 90 degree angle pulls laterally the balancing tension cord 19 in two opposite directions. Two extremities of the balancing tension cord 19 is biased by a pair of tension springs 20 and 21, respectively. When there is no drag on the spiral coil target 15, the balancing tension cord remains at the neutral position in a straight line. The drag force on the spiral coil target exerted by the moving fluid laterally deflects the balancing tension cord 19, which deflection may be indicated mechanically by a pivotable indicator pointer 22 that indicates the scale indicating the flow rate or a position sensor 23 may detect the displacement of the position target 24 secured to the balancing tension cord 19 wherein the signal from the position sensor 23 is processed by a data processor 25 that displays the flow rate data or transmits thereof as an output signal. It is a matter of design to incorporate different means to measure the magnitude of the drag force on the spiral coil target and to convert it to the flow rate data. For example, the spiral coil target may be disposed intermediate and supported by two extremities of a pair of pivoting arms wherein the amount of the drag force on the spiral coil target is measured by detecting the force on and/or the displacement of the pivoting arms.

In FIG. 4 there is illustrated a cross section of a further embodiment of the spiral coil target flow meter including a dual cone spiral coil target 26 coaxially placed within the flow passage 27. The spiral coil target 26 under a high compression is placed intermediate and supported by a pair of load cells 28 and 29, which are installed in line to one another and coaxially within the flow passage 27. The difference in the outputs from two load cells is equal to . the drag force on the spiral coil target 26. The flow rate data is put out by a data processor 30 processing the signals from the load cells 28 and 29. It should be understood that a dual cone spiral coil target under tension can be connected to a pair of load cells in the same manner as the dual cone spiral coil target under compression as shown in FIG. 4. Of course, the extremities of the elongated member constituting the spiral coil target under tension have to be anchored to the load cells in such an installation.

In FIG. 5 there is illustrated a cross section of yet another embodiment of the spiral coil target flow meter employing a dual cone spiral coil target 31 under compression. Two extremities 32 and 33 of the elongated member constituting the dual cone spiral coil target 31 respectively includes two guide holes 34 and 35, which are slidably engaged by two tension cords secured to and extending from opposite extremities of the spiral coil target, respectively. The tension cords 36 and 37 are routed essentially in the same way as that shown in FIG. 3 with one exception being that their extremities anchored to a pivoting pointer 38 is biased by a pair of coil springs 39 and 40 instead of a balancing tension cord, which pair of coil springs establishes the neutral reference point. Of course two means for anchoring the extremities of the tension cords respectively shown in FIGS. 3 and 5 are interchangable.

In FIG. 6 there is illustrated a cross section of an embodiment of the dual cone spiral coil target 41 made of a wire having a substantially circular cross section, which cross section is taken along a plane including the central axis of the dual cone spiral coil target 41. Two extremities 42 and 43 of the wire constituting the dual cone spiral coil target 41 respectively include two eyelets for securing the tension cords. The shape of dual cone of the spiral coil target 41 may be provided by forming the wire into such a shape or by tensioning a substantially plane or spiral coil structure.

In FIG. 7 there is illustrated another embodiment of the dual cone spiral coil target 44 made of an elongated member having a substantially flat cross section wherein the cord line of the flat cross section is substantially parallel to the central axis of the dual cone spiral coil target 44.

In FIG. 8 there is illustrated a further embodiment of the dual cone spiral coil target 45 made of an elongated member having a substantially flat cross section wherein the chord line of the flat cross section is substantially perpendicular to the central axis of the dual cone spiral coil target 45.

In FIG. 9 there is illustrated a cross section of a simple cone spiral coil target 46 made of an elongated member having a substantially flat cross section lined up parallel to the central axis of the spiral coil target 46. The spiraled out extremity 47 of the elongated member is bent back toward the central axis of the spiral spring, wherein it is terminated providing an eyelet 48 in line with the eyelet 49 included in the other extremity of the elongated member. The simple cone spiral coil target 46 can replace the dual cone spiral coil targets employed in the flow meters shown in FIGS. 1 through 5. The fluid flows in the direction from the converging end to the diverging end of the simple cone spiral coil target 46.

In FIG. 10 there is illustrated a cross section of another simple cone spiral coil target 50 having exactly the same construction as that of FIG. 9. This spiral coil target is installed in such a way that fluid flows in the direction from the diverging end to the converging end of the simple cone spiral coil target 50. It should be understood that the simple cone spiral coil target having the same configuration as those shown in FIGS. 9 and 10 can be made of a wire having a substantially circular cross section or of an elongated member having a substantially flat cross section disposed substantially perpendicular to the central axis of the simple cone spiral coil target.

In FIG. 11 there is illustrated a cross section of a flow meter employing substantially planar spiral coil target 51 disposed coaxially within a flow passage 52 having a substantially circular cross section, wherein the planar spiral coil target is supported at the inner extremity 53 of the elongated member constituting the planar spiral coil target 51.

Figure 12:
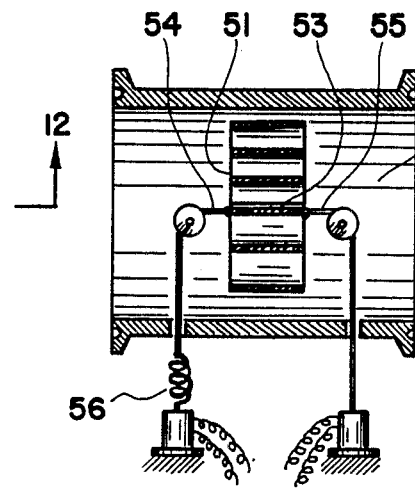
FIG. 12 illustrates another cross section of the spiral coil target flow meter shown in FIG. 11.

In FIG. 12 there is illustrated a cross section of the flow meter shown in FIG. 11 taken along plane 12—12 as shown in FIG. 11. The planar spiral coil target is held in position by a pair of tension cords 54 and 55 respectively secured to and extending from two opposite coners of the inner extremity 53 of the flat elongated member constituting the planar spiral coil target 51. At least one of the two tension cords should include a strong tension spring 56 in order to maintain tension on the pair of the tension cords 54 and 55 at all times. The drag force on the planar spiral coil target 51 transmitted through the tension cords 54 and 55 may be measured and converted to the flow rate data by means of any one of the embodiments shown in FIGS. 1 through 5. It is quite clear that a planar spiral coil target similar to the element 51 can be mounted intermediate two load cells by means of compression rod affixed to the inner extremity of the elongated member constituting the planar spiral coil target and compressively supported between two load cells as shown in FIG. 4, wherein one may employ a short length of a compressive coil spring to biase the compression rod.

Figure 13:
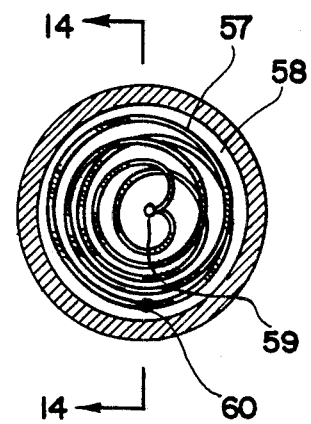
FIG. 13 illustrates a cross section of a spiral coil target flow meter employing a dual cone spiral coil target generating fluid dynamic torque.

In FIG. 13 there is illustrated a cross section of a flow meter comprising a double cone spiral coil target 57 coaxially placed within a flow passage 58 of the flow meter. The double cone spiral coil target is rotatably supported at its central axis 59 and resiliently secured by a balancing tension line at a midsection 60 thereof having the maximum diameter.

Figure 14:
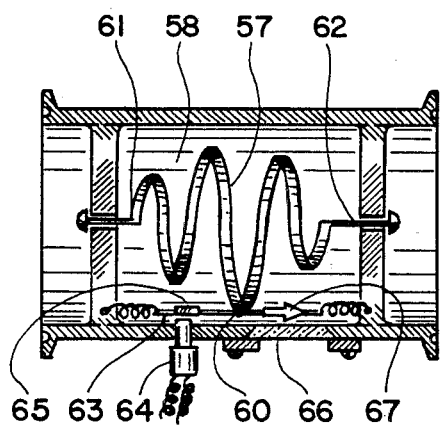
FIG. 14 illustrates another cross section of the spiral coil target flow meter shown in FIG. 13.

In FIG. 14 there is illustrated a cross section of the flow meter shown in FIG. 13 taken along plane 14—14 as shown in FIG. 13. Two extremities 61 and 62 of the dual cone spiral coil target 57 are rotatably and nonslidably supported whereby the dual cone spiral coil target 57 is rotatable about the central axis thereof passing through two extremities 61 and 62 thereof. The midsection 60 of the dual cone spiral coil target 57 having substantially the maximum diameter is secured to a balancing tension cord 63 spring biased and affixed at two extremities thereof, which balancing tension cord 63 elastically restrains the dual cone spiral coil target 57 from rotating about the central axis thereof. The fluid flowing through the flow passage 58 exerts a torque on the dual cone spiral coil target 57, which creates lateral deflection of the balancing tension cord 63. The magnitude of the lateral deflection is detected and converted to flow rate data, which may be accomplished by a position sensor 64 detecting the position of target 65 affixed to the balancing tension cord 63 or by the scales marked on a transparent window 66 enabling reading of the position of the visual indicator 67 affixed to the balancing tension cord 63. It should be understood that the dual cone spiral coil target 57 used in conjunction with the flow meter shown in FIGS. 13 and 14 may be one of many types shown in FIGS. 6, 7 and 8.

Figure 15:
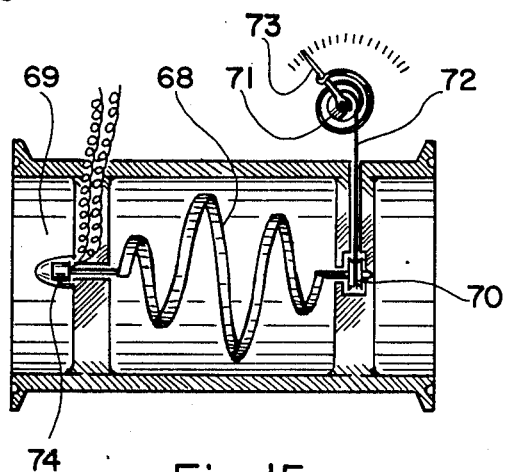
FIG. 15 illustrates a cross section of another spiral coil target flow meter employing a dual cone spiral coil target generating fluid dynamic torque.

In FIG. 15 there is illustrated a cross section of another flow meter including a dual cone spiral coil target 68 rotatably placed within the flow passage 69 of the flow meter. One extremity of the dual cone spiral coil target 68 includes a pulley wheel 70 affixed thereto, which is linked to another pulley wheel 71 that is spring biased to the neutral position by means of a cord 72. A pointer needle 73 affixed to the pulley wheel 71 indicates the amount of flow rate. Instead of the combination including the pulley wheel and pointer needle, the amount of torque exerted on the dual cone spiral coil target 68 by the moving fluid can be measured by a torque measuring load cell 74 and the information on torque can be converted to the flow rate data by a data processor.

Figure 16:
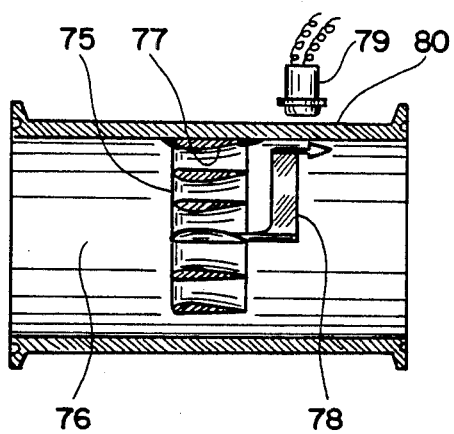
FIG. 16 illustrates a cross section of an embodiment of the spiral coil target flow meter employing a strip coiled in flat spiral coil with a lift-generating cross section.

In FIG. 16 there is illustrated a cross section of a flow meter employing a planar spiral coil target 75 coaxially disposed within the flow passage 76 of the flow meter. The planar spiral coil target 75 is made of a flat elongated member having the cross section of an airfoil disposed substantially parallel to the central axis of the planar spiral coil target 75. The outer extremity 77 of the flat elongated member constituting the planar spiral coil target 75 is affixed to the wall of the flow passage 76, while the inner extremity thereof includes an indicator arm 78 rigidly affixed thereto. The fluid medium moving across the planar spiral coil target 75 produces lift forces in the radial directions which tightens or loosens the spiral construction of the coil target 75. As a consequence, the indicator arm 78 rotates about the central axis of the planar spiral coil target 75. The amount of the movement of the indicator arm measured by a position indicator 79 or by a direct reading through the transparent wall 80 is converted to the flow rate data.

Figure 17:
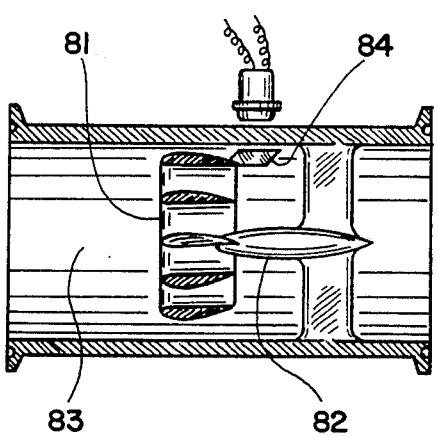
FIG. 17 illustrates a cross section of another embodiment of the spiral coil target flow meter employing a strip coiled in a flat spiral with a lift-generating cross section.

In FIG. 17 there is illustrated a cross section of another flow meter constructed in essentially the same way as that shown in FIG. 16 with one exception being that the planar spiral coil target 81 made of a flat elongated member having a lift-generating cross section is secured to the securing structure 82 affixed to the wall of the flow passage 83 of the flow meter at the inner extremity thereof, while the outer extremity thereof includes a indicator marker 84. The lift force produced by the fluid flowing across the planar spiral coil target 81 rotates the marker 84 about the central axis of the planar spiral coil target 81, which movement of the marker 84 is converted to the flow rate data by means described in conjunction with FIG. 16.

While the principles of the present invention have now been made clear by the illustrative embodiment, it will be immediately obvious to those skilled in the art many modifications of the structures, arrangements, proportion, elements and materials which are particularly adapted to the specific working environments and operating conditions in the practice of the invention without departing from those principles.

I claim:

1. A spiral coil target flowmeter comprising in combination:

(a) a flowmeter body including a flow passage extending from one extremity to the other extremity of the flowmeter body;

(b) a spiral coil target comprising an elongated elastic member shaped into a spiral disposed within the flow passage in a substantially coaxial relationship wherein said spiral coil target is held in position in a prestressed state by a first load cell connected to one extremity of said spiral coil target and by a second load cell connected to the other extremity of said spiral coil target; and (c) means for measuring the difference in load cell output between the two load cells as a measure of the fluid flow moving through said flow passage.

2. The combination as set forth in claim 1 wherein said spiral coil target is preloaded by an initial compression.

3. The combination as set forth in claim 1 wherein said spiral coil target is preloaded by an initial tension.

4. The combination as set forth in claim 1 wherein said spiral coil target is a dual spiral coil comprising said elongated elastic member spiraling out starting from said one extremity and spiraling in ending at said the other extremity of said spiral coil target.

5. The combination as set forth in claim 1 wherein said elongated elastic member has a cross section of a substantially round shape.

6. The combination as set forth in claim 1 wherein said elongated elastic member has a cross section of a substantially flat geometry disposed substantially parallel to the central axis of said spiral coil target.

7. The combination as set forth in claim 1 wherein said elongated elastic member has a cross section of a substantially flat geometry disposed substantially perpendicular to the central axis of said spiral coil target.

8. A spiral coil target flowmeter comprising in combination:
  (a) a flowmeter body including a flow passage extending from one extremity to the other extremity of said flowmeter body;
  (b) a spiral coil target comprising an elongated member shaped into a spiral disposed within the flow passage in a substantially coaxial relationship wherein said spiral coil target is supported by a support rotatably supporting one extremity of said spiral coil target and by a torque measuring means connected to the other extremity of said spiral coil target; and
  (c) means for measuring output of said torque measuring means as a measure of the fluid flow moving through said fluid passage.

9. The combination as set forth in claim 8 wherein said spiral coil target is a dual spiral coil comprising said elongated member spiraling out starting from said one extremity and spiraling in ending at said the other extremity of said spiral coil target.

10. The combination as set forth in claim 8 wherein said elongated member has a cross section of a substantially round shape.

11. The combination as set forth in claim 8 wherein said elongated member has a cross section of a substantially flat geometry disposed substantially parallel to the central axis of said spiral coil target.

12. The combination as set forth in claim 8 wherein said elongated member has a cross section of a substantially flat geometry disposed substantially perpendicular to the central axis of said spiral coil target.

13. A spiral coil target flowmeter comprising in combination:
  (a) a flowmeter body including a flow passage extending from one extremity to the other extremity of the flowmeter body;
  (b) a spiral coil target comprising an elongated elastic member shaped into a spiral disposed within the flow passage in a substantially coaxial relationship wherein said spiral coil target is rigidly secured to said flowmeter body at one extremity of said elongated elastic member; and
  (c) means for measuring torsional deflection of the other extremity of said elongated elastic member about the central axis of said spiral coil target as a measure of fluid flow moving through said flow passage.

14. The combination as set forth in claim 13 wherein said elongated elastic member has a substantially flat airfoil-like cross section disposed substantially parallel to the central axis of said spiral coil spring.

* * * * *